CHARLES R. ELY, OF NORTHFIELD, VERMONT.

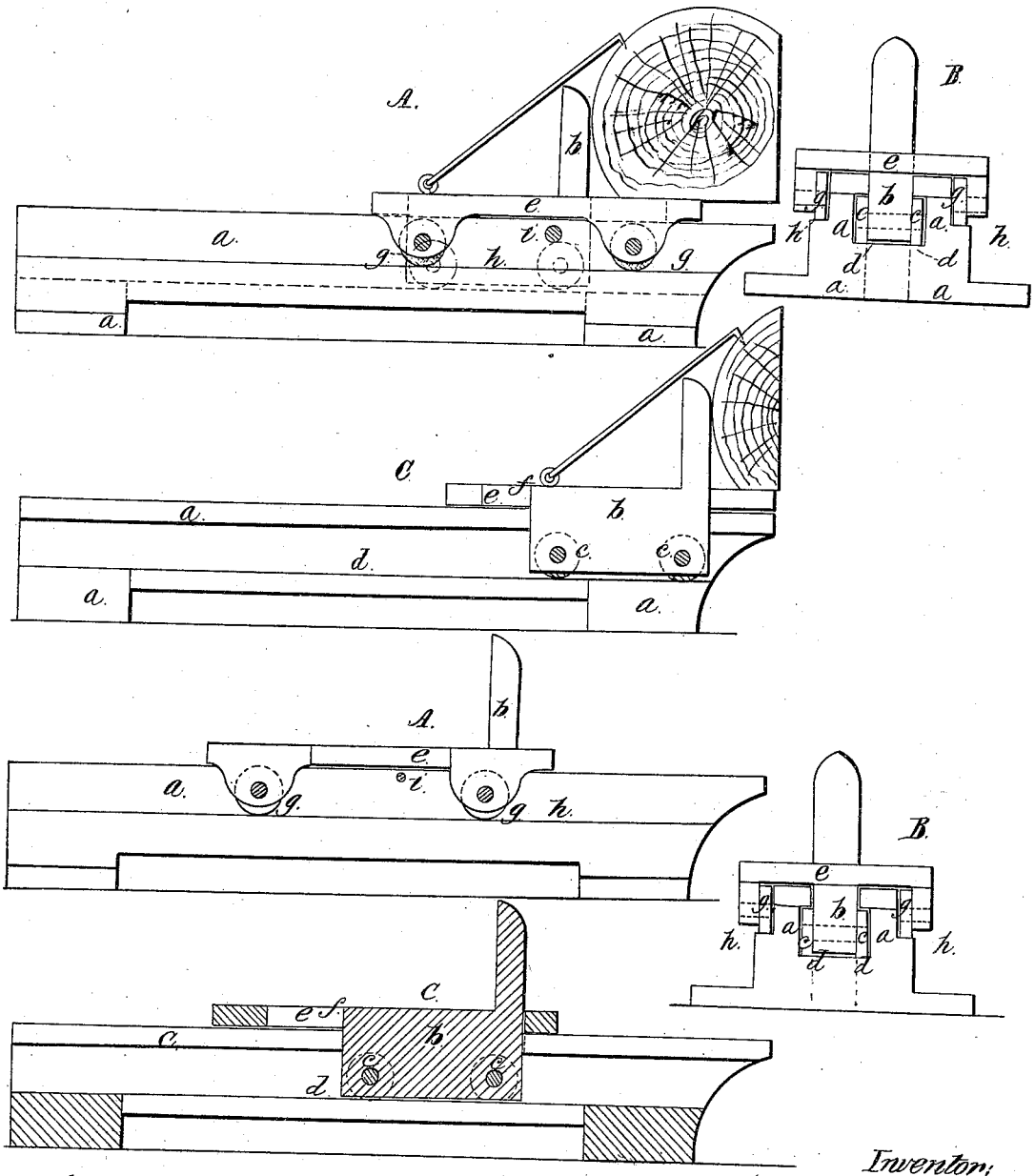

Letters Patent No. 86,517, dated February 2, 1869.

IMPROVEMENT IN HEAD-BLOCKS.

The Schedule referred to in these Letters Patent and making part of the same.

*To all whom it may concern:*

Be it known that I, CHARLES R. ELY, of Northfield, in the county of Washington, and State of Vermont, have invented an Improvement in Saw-Mills; and I do hereby declare that the following, taken in connection with the drawings, which accompany and form part of this specification, is a description of my invention sufficient to enable those skilled in the art to practise it.

My invention relates to the manner of mounting the mechanism which supports the log to be sawed.

As generally constructed, the head-block has wings, or projections, which travel in grooves or ways in a bed-piece. Under the weight of a heavy log, the pressure or friction upon the surfaces is so great as to render it difficult to feed the blocks forward for the successive operations of the saw.

To obviate this difficulty, I mount the head-blocks upon wheels, or friction-rolls, bringing the upper surface of each head-block above the bed, the rolls travelling over suitable track-surfaces; and it is in this construction that my invention primarily consists, as also in combining with the head-block a shoe or carriage, mounted on wheels, and operating in connection with the block, as will be hereinafter described.

The drawings represent a head-block and adjacent mechanism, embodying my improvements—

A showing a side elevation,
B, an end view, and
C, a vertical longitudinal section thereof.

*a* denotes the bed upon which the knee-head *b* is supported and moves.

This head or block is shown as mounted on four wheels, *c*, which ride upon a horizontal track or surfaces or grooves, *d*, the top surface of the block *b* projecting above the upper surface of the bed *a*, as seen in the drawings.

Now, it will readily be seen that when the log is properly secured to a series of head-blocks thus arranged, it may be fed up into line with the saw with great facility, the friction being, to a great degree, overcome by mounting the blocks upon the wheels.

When a very large log is being sawed, much difficulty is sometimes occasioned in moving the log, by reason of the tendency of the log to roll, thereby canting up the head-blocks, and causing them to bind in the grooves in which they slide or roll.

To obviate this, I employ a long shoe or carriage, *e*, surrounding the block *b*, and having a groove, *f*, corresponding in width to the thickness of the block *b*, or of breadth sufficient to allow the block to slide freely through it, the upper surface of this carriage being flush with the upper surface of the block.

This carriage is mounted on wheels, *g*, which travel upon side rails or ways, *h*, on the opposite sides of the bed *a*.

When the log is fixed to the head-blocks, the carriage *e* is slid back, and each block *b* is slid back in the carriage.

As the head-blocks and log are fed forward, for the successive operations of the saw, the carriage and block maintain a relative fixed position, until the carriage strikes a projection, *i*, when the carriage will stop, the log having been reduced in thickness so much as to obviate its liability to tip. The head-block may then continue to be fed forward alone, until the sawing of the log is completed.

I claim the knee *b*, mounted upon wheels or rollers *c*, which travel in grooves *d* of the bed *a*, substantially as shown and described.

I also claim, in combination with the head-block of a saw-mill, a carriage or shoe, *e*, arranged to operate substantially as described.

CHARLES R. ELY.

Witnesses:
FRANCIS GOULD,
L. H. LATIMER.